United States Patent
Norelli

(10) Patent No.: US 8,621,760 B2
(45) Date of Patent: *Jan. 7, 2014

(54) HANDS-FREE MEASURING INSTRUMENT

(76) Inventor: Louis A. Norelli, East Northport, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/030,542

(22) Filed: Feb. 18, 2011

(65) Prior Publication Data

US 2011/0138642 A1   Jun. 16, 2011

Related U.S. Application Data

(63) Continuation-in-part of application No. 12/611,354, filed on Nov. 3, 2009, now Pat. No. 7,913,406.

(60) Provisional application No. 61/112,903, filed on Nov. 10, 2008.

(51) Int. Cl.
*G01C 9/26* (2006.01)

(52) U.S. Cl.
USPC ............... 33/371; 33/347; 33/451; 33/DIG. 1

(58) Field of Classification Search
USPC ....... 33/347, 370, 371, 451, 465, 484, DIG. 1
See application file for complete search history.

(56) References Cited

U.S. PATENT DOCUMENTS

| | | | |
|---|---|---|---|
| 336,610 A * | 2/1886 | Evans | 160/345 |
| 426,001 A | 4/1890 | Evans | |
| 2,526,528 A | 10/1950 | Zickler et al. | |
| 3,522,657 A * | 8/1970 | Metrulis | 33/451 |
| 3,775,853 A | 12/1973 | Doret et al. | |
| 3,786,885 A | 1/1974 | Mills | |
| 3,820,249 A * | 6/1974 | Stone | 33/347 |
| 4,166,322 A | 9/1979 | Hirano | |
| 4,168,578 A | 9/1979 | VanderWerf | |
| 4,194,295 A | 3/1980 | Simuro et al. | |
| 4,205,450 A | 6/1980 | Xuereb | |
| 4,206,551 A | 6/1980 | Matsugu et al. | |
| 4,255,867 A | 3/1981 | Taylor | |
| 4,270,277 A | 6/1981 | Koenuma | |
| 4,312,133 A | 1/1982 | Mima | |
| 4,426,790 A | 1/1984 | Kimel | |
| 4,430,805 A | 2/1984 | Mutoh et al. | |
| 4,573,270 A | 3/1986 | D'Amico | |
| 4,574,492 A | 3/1986 | Miller | |
| 4,653,194 A | 3/1987 | Kim | |
| 4,773,163 A | 9/1988 | Wolford, Jr. | |
| 5,014,438 A | 5/1991 | Gravel | |

(Continued)

FOREIGN PATENT DOCUMENTS

| | | |
|---|---|---|
| EP | 0 922 927 A2 | 6/1999 |
| EP | 0 922 927 A3 | 5/2000 |

*Primary Examiner* — G. Bradley Bennett
(74) *Attorney, Agent, or Firm* — Carter, DeLuca, Farrell & Schmidt, LLP; Russell S. Salerno

(57) ABSTRACT

A hands-free measuring instrument is disclosed. The disclosed instrument includes an upright member extending perpendicularly from a base member. At least one magnet is affixed to the instrument to facilitate the mounting thereof on a ferrous workpiece. The disclosed instrument includes at least one level disposed thereupon. Graduations may be provided on the instrument to facilitate measurement of linear distances. Embodiments are disclosed wherein an adjustable ruler arm is provided to facilitate the measurement and inscribing of arbitrary angles relative to the upright member.

19 Claims, 10 Drawing Sheets

(56) References Cited

U.S. PATENT DOCUMENTS

| | | |
|---|---|---|
| 5,050,309 A | 9/1991 | Wang |
| 5,101,569 A | 4/1992 | Watkins |
| 5,113,596 A | 5/1992 | Meyers |
| 5,193,284 A | 3/1993 | Lin |
| 5,325,798 A | 7/1994 | Nowell et al. |
| 5,340,229 A | 8/1994 | Schwartzman |
| 5,461,794 A | 10/1995 | Huang |
| 5,475,931 A | 12/1995 | Wei |
| 5,491,907 A | 2/1996 | Vidmar |
| 5,497,558 A | 3/1996 | Wagner |
| 5,531,029 A | 7/1996 | Hawes |
| 5,586,395 A * | 12/1996 | Malczewski ............... 33/451 |
| 5,826,346 A | 10/1998 | Reilly |
| 5,894,344 A | 4/1999 | Tamez et al. |
| 5,894,675 A | 4/1999 | Cericola |
| 6,029,360 A * | 2/2000 | Koch ............... 33/382 |
| 6,105,264 A | 8/2000 | Phillips |
| 6,128,824 A | 10/2000 | Yang |
| 6,141,882 A * | 11/2000 | Syken ............... 33/465 |
| 6,595,482 B1 | 7/2003 | Armbruster |
| 6,678,967 B1 | 1/2004 | Jueneman |
| 6,886,263 B2 | 5/2005 | Chou |
| 7,024,788 B2 | 4/2006 | Mason |
| 7,082,692 B2 * | 8/2006 | Shapiro ............... 33/465 |
| 7,171,757 B1 | 2/2007 | Stoneberg |
| 7,253,611 B2 | 8/2007 | Ma et al. |
| 7,287,329 B2 | 10/2007 | Cornacchio |
| 7,296,366 B2 | 11/2007 | Lin |
| 7,913,406 B2 * | 3/2011 | Norelli ............... 33/371 |
| 2004/0231171 A1 | 11/2004 | Cornacchio |
| 2005/0086818 A1 | 4/2005 | Lin |
| 2006/0005408 A1 | 1/2006 | Fernand |
| 2007/0234581 A1 | 10/2007 | Ming |
| 2008/0141546 A1 | 6/2008 | Strutt et al. |
| 2010/0205814 A1 | 8/2010 | Allemand |

\* cited by examiner

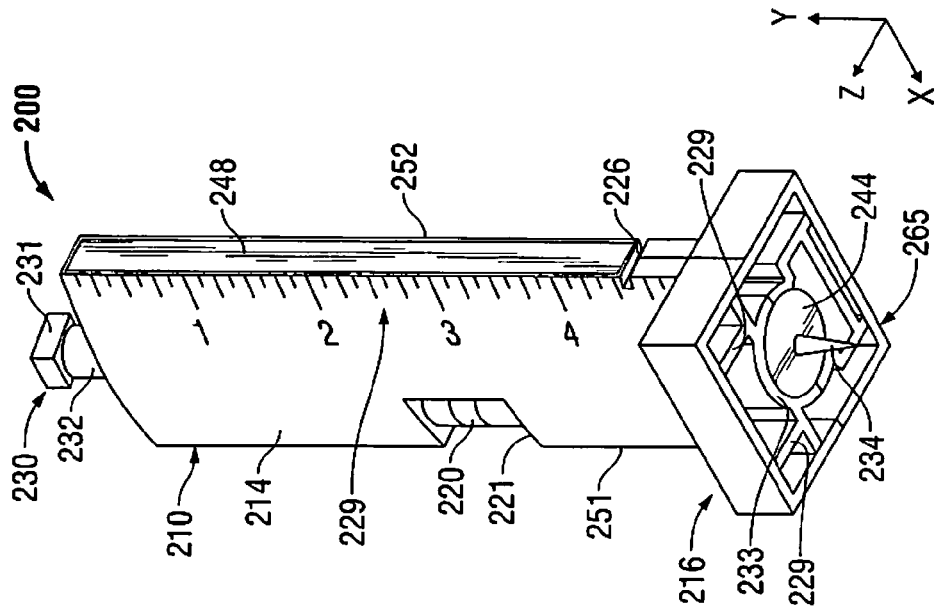
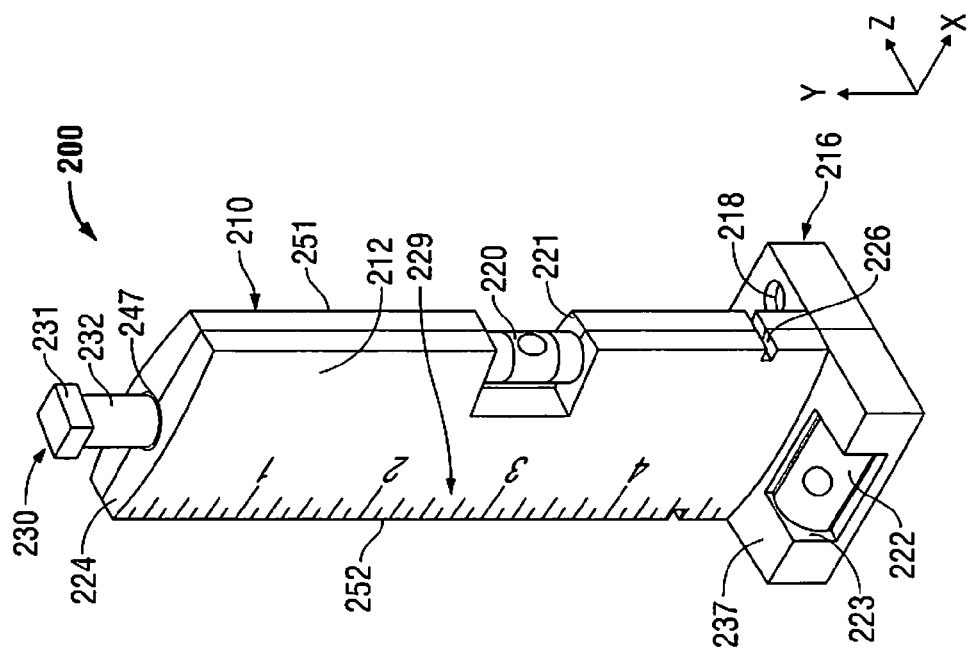

HANDS-FREE MEASURING INSTRUMENT

CROSS-REFERENCE TO RELATED APPLICATION

This application is a continuation-in-part of U.S. patent application Ser. No. 12/611,354, entitled "HANDS FREE MEASURING INSTRUMENT", filed Nov. 3, 2009 by Louis A. Norelli, which claims the benefit of priority to U.S. Provisional Application Ser. No. 61/112,903 entitled "PLATFORM RULER", filed Nov. 10, 2008 by Louis A. Norelli, the entirety of each being hereby incorporated by reference herein for all purposes.

BACKGROUND

1. Technical Field

The present disclosure relates to measuring instruments, and more particularly, to an instrument for assisting in the process of plumbing, leveling, or making straight any individual or interconnected objects of any shape for use by builders, carpenters, iron workers, masons, and other tradespersons.

2. Background of Related Art

The ruler, extension ruler, and tape measure are among the most commonly used measuring devices in the construction field. These measuring devices can also act as a guide or a gauge when building to plumb, level or straight is required. When undertaking a construction project, these qualities are essential to providing a professional and accurate product. This demand for accuracy creates challenges for a builder.

Different methods may be used by a builder to achieve plumb, level, and straight. When building to plumb or level, a builder can use a bubble level to fulfill these requirements. A bubble level's accuracy may be diminished by the length of the level relative to the length or size of the project being built. When a long horizontal span is required, the builder may use a dry line or laser to achieve better accuracy. For a vertical application, a plumb bob line or laser may used for better accuracy.

A useful skill in building to these requirements is the ability to fasten or secure material precisely and consistently. When setting up material to be fastened or secured, adjustments often need to be made to the material. However, when adjusting the material, a builder may often place the measuring device back in a tool belt, or otherwise put the measuring device aside, so that one or both hands can be used to adjust the building material. Occasionally, one hand can adjust material while the other hand holds the measuring device. When the desired dimension is found, both hands again may need to be freed to perform the fastening process. Consequently, a carpenter may be unable to assess or monitor the corresponding measurement until after the material is fastened or secured. Once the material is fastened or secured, the measurement will be checked again to ensure that the material did not move while fastening or securing the material. If the material moved during the fastening process, the fastening must be undone and the process repeated. This same procedure is needed not only for vertical applications, but for horizontal, levels and straights as well.

SUMMARY

The present disclosure is directed to a measuring instrument adapted to facilitate hands-free measuring in one or more (e.g., upright, horizontal or upsidedown) orientations. In one envisioned embodiment, the disclosed instrument includes a base, and a body projecting orthogonally therefrom. The instrument may include ruler graduations, one or more bubble level vials, one or more notches adapted to operably engage a line (e.g., string) and/or one or more pilot holes. In an embodiment, the disclosed instrument includes one or more magnets to facilitate the mounting thereof on ferrous material. A spring-loaded spike assembly may be included in the instrument to facilitate the mounting thereof on wooden material, on gypsum-based materials (e.g., wallboard such as Sheetrock®, manufactured by USG Corporation of Chicago, Ill., United States), on composite materials (e.g., polymer-based materials such as Trex®, manufactured by Trex Company of Winchester, Va., United States), and the like.

The disclosed instrument may provide utility for many different purposes, including without limitation, measuring, leveling, and squaring material. It is contemplated that an instrument in accordance with the present disclosure may be fixed in place temporarily, which may enable a builder to adjust material to its desired position, distance, and/or orientation, and fasten the material at the same time in a "hands-free" manner. It may remain in place to confirm that the fastening process was accurate.

The base may be adapted for particular purposes. For example and without limitation, the base may be magnetized which may be useful when a builder is framing metal studs or metal door frames. The disclosed device may enable a carpenter to take vertical readings without manually holding the measuring device. The disclosed device may be positioned vertically for horizontal reading, either right side up or upside down, as is typically required when constructing fascias, soffits, or free standing walls. Metal track (e.g., suspended ceilings) can be lowered or raised to the corresponding dimensions established by the builder, with the use of a dry line or a laser line.

The base of the disclosed instrument may include a screw or other threaded means for attaching to wood, and/or may include a suction device (e.g., a suction cup) for attaching the base to glass or non-magnetic metals (e.g., aluminum). The base may provide a balanced and sturdy mounting that is well-adapted to the leveling of concrete ("mud") floors, sub-floors and raised flooring, e.g., computer room floors.

In an embodiment, the disclosed hands-free measuring instrument includes a base member having a top surface and a bottom surface. An upright member is coupled to the top surface base and extends orthogonally (e.g., at a right angle) therefrom. A first magnet may be disposed on a bottom surface of the base member to enable the instrument to be magnetically secured to a ferrous workpiece. A second magnet may additionally or alternatively be disposed on a vertical edge of the upright member. The instrument includes at least one bubble level vial disposed on the instrument, and may include one bubble level disposed horizontally on the base member, and/or one bubble level disposed vertically on the upright member.

In embodiments, a spike assembly may be disposed within the instrument that is adapted to mechanically secure the measuring instrument to a workpiece. The spike assembly may include a shaft slidably disposed within the upright member. A top end of the shaft may extend upwardly beyond a top surface of the upright member. The bottom end of the shaft may include a spike tip coupled thereto. The shaft includes at least one stop member configured to limit upward and/or downward travel of the shaft.

In another embodiment in accordance with the present disclosure, a hands-free measuring instrument includes a base member having a top surface and a bottom surface, and a first magnet disposed on a bottom surface of the base member and configured to secure the measuring instrument to a workpiece. The instrument includes an upright member coupled to the top surface base and extending orthogonally therefrom, and a second magnet disposed on a vertical edge of the upright member and configured to secure the measuring instrument to a workpiece. The measuring instrument includes an adjustable ruler arm rotatable around a pivot adjacent to a top surface of the upright member. The pivot may be configured to selectively retain the adjustable ruler arm in a fixed position. At least one of the upright member or the adjustable ruler arm includes one or more detents configured to index the adjustable ruler arm to a predetermined position. The upright member may include a one or more angular graduations disposed on a face of the upright member. The one or more angular graduations may be numerated to indicate the angle at which the adjustable ruler arm is positioned relative to the upright member.

BRIEF DESCRIPTION OF THE DRAWINGS

The above and other aspects, features, and advantages of the present disclosure will become more apparent in light of the following detailed description when taken in conjunction with the accompanying drawings in which:

FIG. 3A shows a top-left perspective view of another embodiment of a hands-free measuring instrument in accordance with the present disclosure;

FIG. 3B shows a bottom-right perspective view of another embodiment of a hands-free measuring instrument in accordance with the present disclosure;

DETAILED DESCRIPTION

Figure 1B:
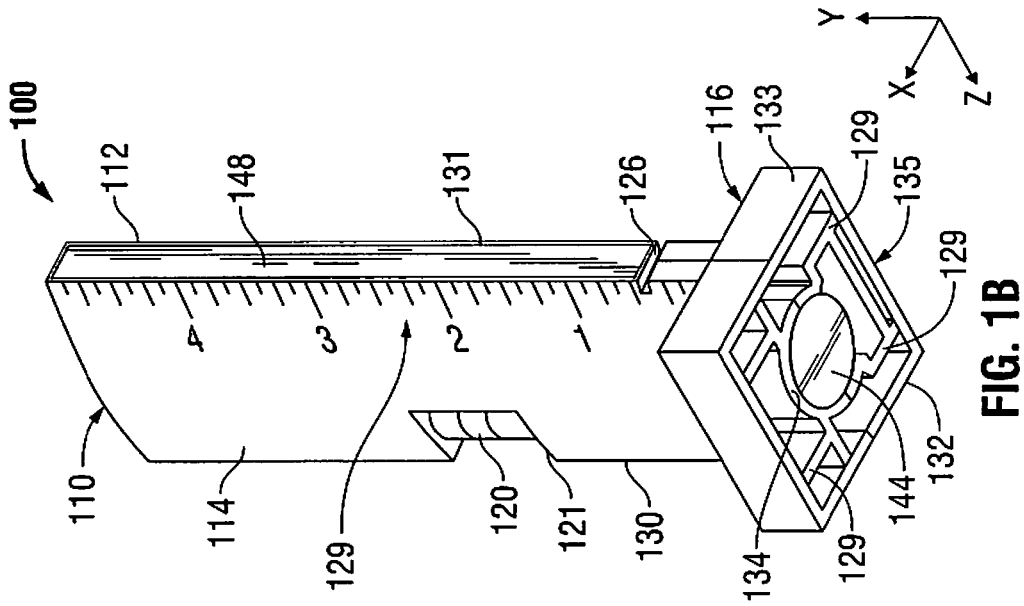
FIG. 1B shows a bottom-right perspective view of an embodiment of a hands-free measuring instrument in accordance with the present disclosure.
Figure 1A:
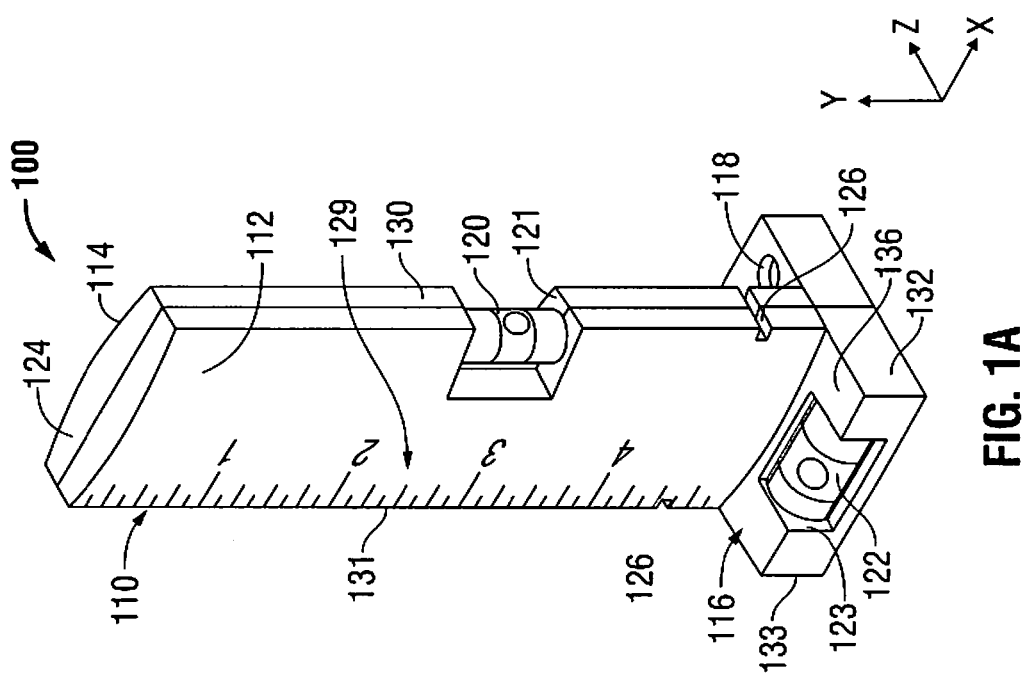
FIG. 1A shows a top-left perspective view of an embodiment of a hands-free measuring instrument in accordance with the present disclosure.
Figure 1D:
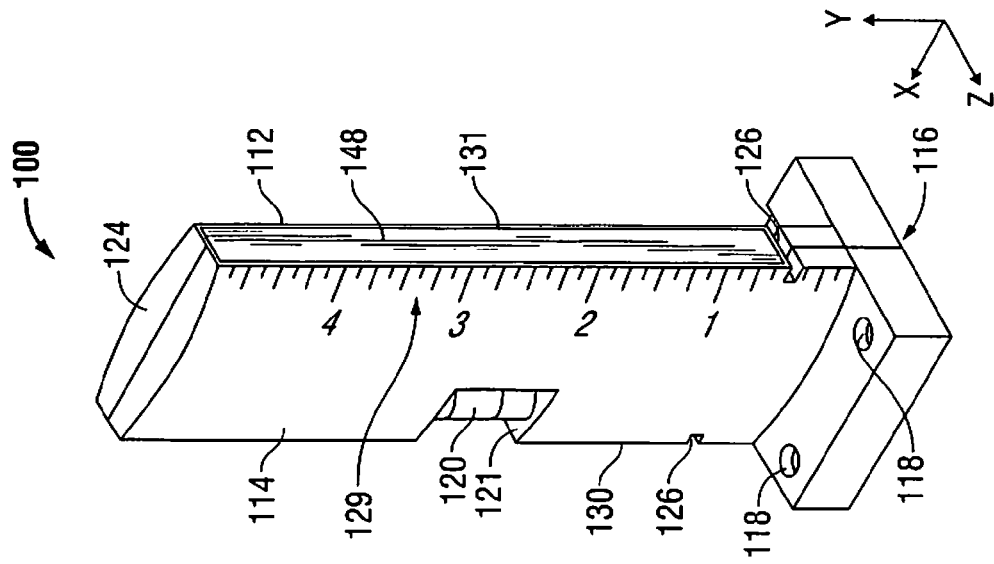
FIG. 1D shows a right-rear perspective view of an embodiment of a hands-free measuring instrument in accordance with the present disclosure.
Figure 1C:
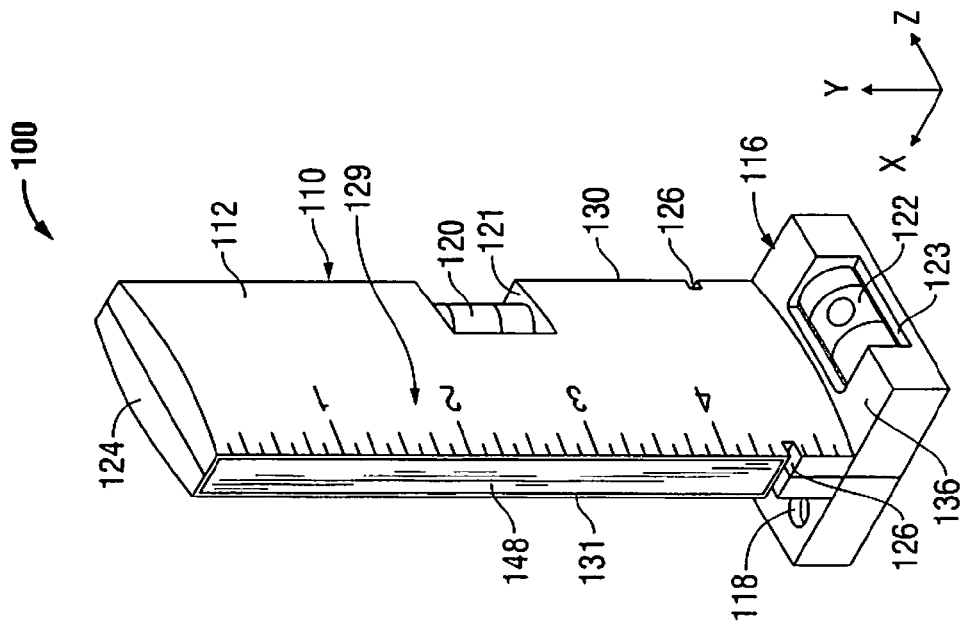
FIG. 1C shows a left-rear perspective view of an embodiment of a hands-free measuring instrument in accordance with the present disclosure.

Particular embodiments of the present disclosure are described hereinbelow with reference to the accompanying drawings; however, it is to be understood that the disclosed embodiments are merely exemplary of the disclosure, which may be embodied in various forms. Well-known and/or repetitive functions and constructions are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

As used herein, terms referencing orientation, e.g., "top", "bottom", "up", "down", "left", "right" and the like are used for illustrative purposes with reference to the figures and corresponding axes shown therein. However, it is to be understood that an instrument in accordance with the present disclosure may be utilized in any orientation without limitation. It is also to be understood that, although the terms "first", "second", etc. may be used herein to describe various elements or positions, these elements or positions should not be limited by these terms. These terms are used to distinguish one element or position from another, but not to imply a required sequence of elements or positions. In this description, as well as in the drawings, like-referenced numbers represent elements which may perform the same, similar, or equivalent functions.

Figure 2C:
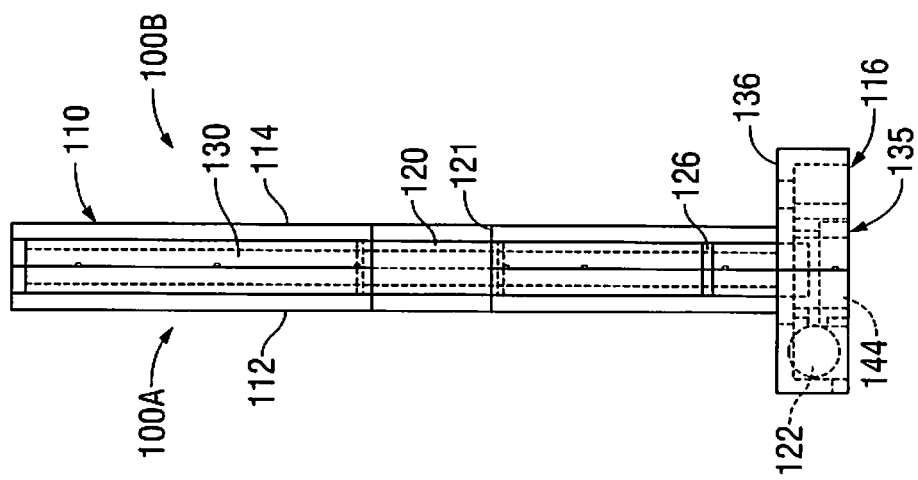
FIG. 2C is a front plan view of an embodiment of a hands-free measuring instrument in accordance with the present disclosure.
Figure 2B:
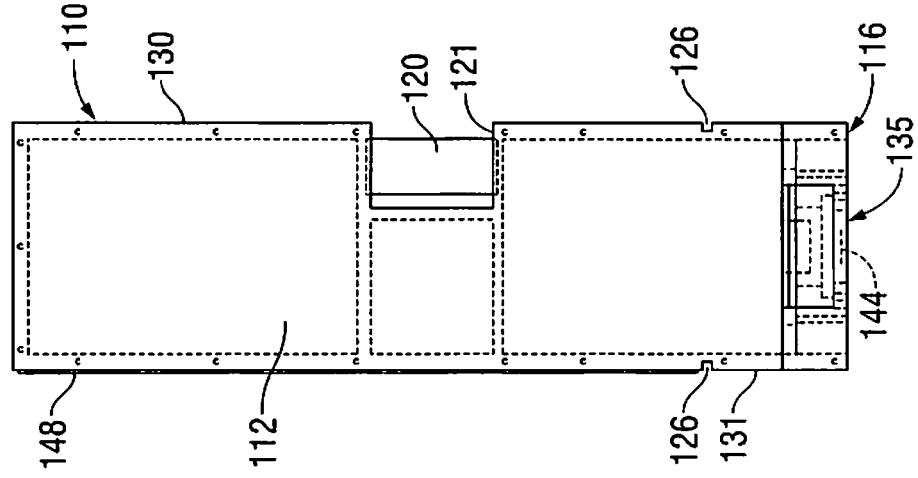
FIG. 2B is a side plan view of an embodiment of a hands-free measuring instrument in accordance with the present disclosure.
Figure 2A:
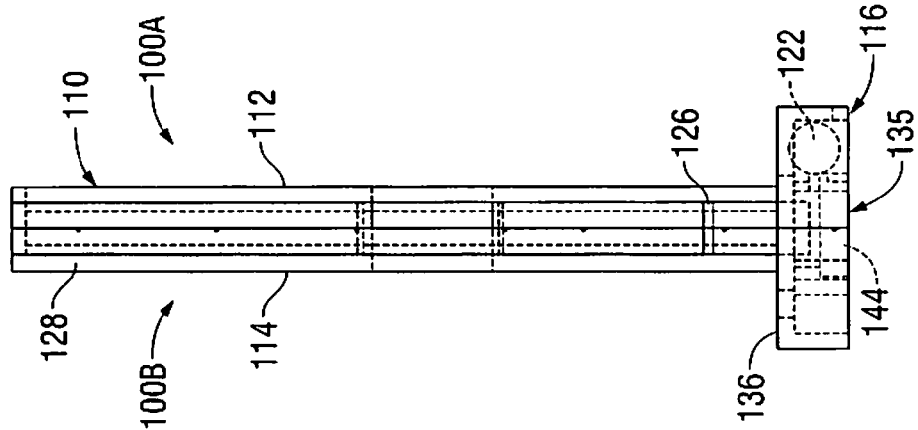
FIG. 2A is a rear plan view of an embodiment of a hands-free measuring instrument in accordance with the present disclosure.
Figure 2D:
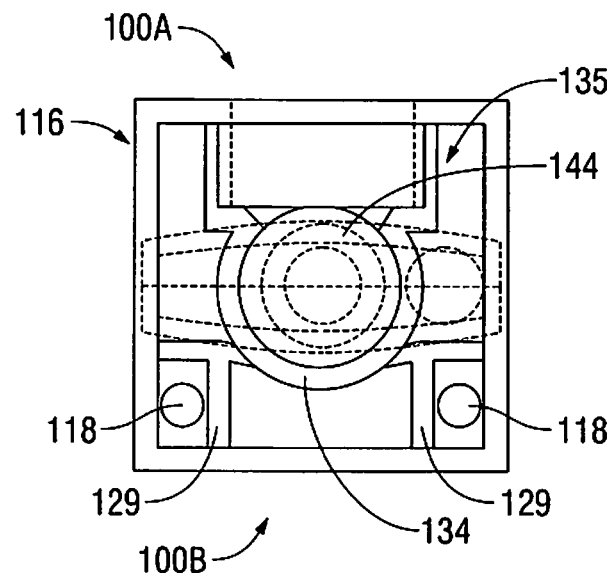
FIG. 2D is a bottom plan view of an embodiment of a hands-free measuring instrument in accordance with the present disclosure.
Figure 2E:
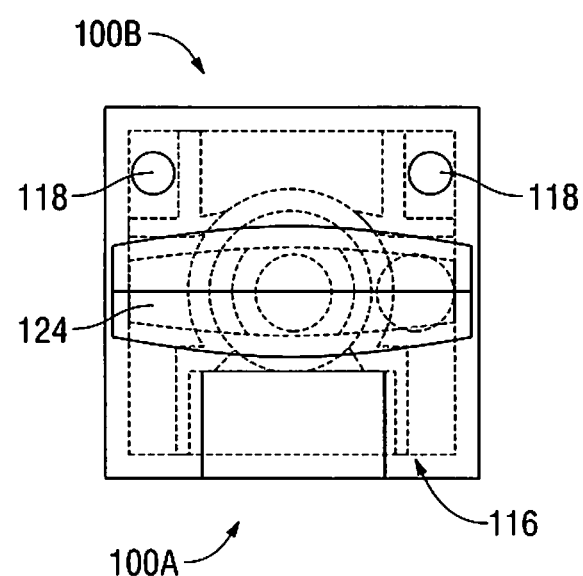
FIG. 2E is a top plan view of an embodiment of a hands-free measuring instrument in accordance with the present disclosure.

With reference to FIGS. 1A-1D and 2A-2E, an embodiment of a hands-free measuring instrument 100 in accordance with the present disclosure is shown. The disclosed instrument 100 includes a base 116 having an upright 110 extending orthogonally therefrom. Base 116 and upright 110 may be integrally formed, and/or may be formed in whole or in part from subassemblies. In an embodiment, base 116 and upright 110 may be formed by injection molding, as described hereinbelow. As best shown in FIGS. 2D and/or 2E, base 116 has a substantially flattened (e.g., squat) cube shape, however, it is contemplated that base 116 may have any suitable shape, including without limitation, a squat cylindrical shape, a squat prism-shape (triangular), extruded oval shape, extruded polygonal shape, and the like. A cutout 123 is defined in base 116 and is configured to retain a first bubble level vial 122 that is mounted therein in alignment with a horizontal axis ("X") of the base. In an embodiment, first bubble level vial 122 may be retained by at least one circular recess (not explicitly shown) defined in either end of cutout 123 that is dimensioned to receive an end of first bubble level vial 122. It should be understood that any suitable manner of retention of bubble level vial 122 may be employed, including without limitation, adhesive, plastic welding, clip, threaded fastener, and/or interference fit. Additionally or alternatively to a bubble level, other types of levels may also be employed, including without limitation, a pendulum-based levels and an accelerometer-based level (e.g., an electronic level employing an silicon accelerometer, and the like).

Base 116 may additionally or alternatively include at least one pilot hole 118 defined therein. As shown pilot hole 118 is oriented along a vertical axis ("Y") of instrument 110, and may be oriented along a horizontal axis ("X" or "Z") and/or an angle thereto (e.g., at a 30°, 45°, 60°, or other desired angle thereto). During use, a carpenter may utilize the at least one pilot hole 118 to scribe a mark onto a targeted material or surface thereof. Additionally or alternatively, a carpenter may pass a fastener (nail, screw, bolt, etc.) through a pilot hole 118 to affix instrument 100 to a workpiece.

As seen in FIG. 1B, base 116 includes a first magnet 144 joined to a bottom surface 135 thereof. First magnet 144 may include a permanent magnet formed from, e.g., alnico, ceramic, ferrite, neodymium, and/or samarium cobalt material. Additionally or alternatively, first magnet 144 may include an electromagnet which may be selectively activated by an actuator, such as without limitation, a pushbutton or slide switch configured to energize or de-energize an electromagnetic coil (not explicitly shown) included within instrument 100 and/or first magnet 144. A bottom surface of first magnet 144 may be substantially aligned with a bottom surface 135 of base 116 to facilitate sturdy placement of instrument 110 on a desired surface. As shown, first magnet 144 may be substantially disc-shaped, however it is envisioned that first magnet 144 may encompass any suitable shape.

Base 116 and/or upright 110 may be formed by any suitable manner of manufacture, including without limitation, injection-molding. In an embodiment, one or more reinforcing struts 129 may be included within base 116 and/or housing 110. At least one semicircular strut 134 may be formed within base 116 to form a cavity (not explicitly shown) that is dimensioned to retain magnet 144 by any suitable manner of retention, including without limitation, adhesive, plastic welding, clip, threaded fastener, and/or interference fit. Magnet 144 may be formed by injection molding, and may be formed in situ by direct injection of magnetic material into a cavity formed by at least one semicircular strut 134.

As described hereinabove, an upright 110 extends perpendicularly from base 116. Upright 110 has a generally elongate cuboid shape having a top surface 124, a first side surface 112 (e.g., a left side), a second side surface 114 (e.g., a right side), a front edge 130, and a rear edge 131. Side surfaces 112 and 114 may include a curved surface, which may have a convex contour, as best seen in, e.g., FIG. 1A. In an embodiment, a front edge 130 of upright 110 is substantially aligned with a front edge 132 of base 116, and/or a rear edge 131 of upright 110 is substantially aligned with a rear edge 133 of base 116. During use, the right angle arrangement of upright 100 and base 116 enables a side of upright 110 and/or base 116 to be positioned against a workpiece to establish a square reference mark, as will be readily appreciated.

A cutout 121 is defined in upright 110 that is configured to retain a second bubble level vial 122 that is mounted therein in alignment with a vertical axis ("Y") of the instrument. In an embodiment, second bubble level vial 120 may be retained by at least one circular recess (not explicitly shown) defined in either end of cutout 121 that is dimensioned to receive an end of second bubble level vial 122. It should be understood that any suitable manner of retention of bubble level vial 120 may be employed, as described hereinabove.

Upright 110 may include at least one notch 126 defined in a front edge 130 or a rear edge 131 thereof. The at least one notch 126 has a width that is dimensioned to accept a dry line, e.g., a width in a range of about 1/32" to about 3/32". In an embodiment, the at least one notch 126 is positioned at an easily-remembered distance from a bottom surface of base 116, for example without limitation, 1/2" or 1 cm. In an embodiment, upright 110 and/or base 116 may include at least one laser diode (not explicitly shown) that is adapted to selectively emit visible laser light, e.g., having a wavelength of about 650 nm, and having a beam direction that is aligned with an axis (e.g., "X", "Y", and/or "Z" axis) of instrument 110. In such an embodiment, instrument 100 may be used as a laser leveling device. The at least one laser diode may be adapted to cooperate with an active target that senses laser light impinging thereon to provide audio and/or visual feedback to a user. In yet another embodiment, upright 110 and/or base 116 may include at least one electromagnetic and/or electroacoustic measuring device, e.g., a laser-based or ultrasound-based rangefinder, to enable the measurement of distances greater than the dimension of upright 110 and/or base 116.

Upright 110 may additionally or alternatively include a series of graduations 129 disposed on a first side 112 and/or a second side 114 of upright 110, adjacent to and substantially following a front edge 130 and/or a rear edge 131 thereof. Graduations 129 may form a ruler demarcated with any suitable unit(s) of measurement, including without limitation, Imperial units (inches and/or fractions thereof), metric units (cm, mm, etc.), and/or a combination thereof. The origin (e.g., zero point) of graduations 129 may coincide with a plane described by a top surface 124 of the upright 110, a top surface 136 of the base 116, and/or a bottom surface 135 of the base 116. Advantageously, by indexing the origin of graduations 129 with, e.g., a bottom or top surface of instrument 100, measurements of material may be easily and accurately achieved in a hands-free manner. By way of example only, during use, a carpenter may affix instrument 100 to a workpiece (using magnetic or mechanical attachment) and align the workpiece to a line using graduations 129 as a reference. When the workpiece is properly aligned to the line, the carpenter may then fasten the workpiece in place. In this manner, a user may use both hands to position and fasten the workpiece, rather than attempt to hold a conventional ruler and/or level in place while both positioning and fastening the work. Significant improvements in efficiencies and precision may thus be realized by use of an instrument 100 as disclosed herein.

A second magnet 148 may be disposed on a front edge 130 and/or a rear edge 131 of upright 110. Second magnet 148 may be formed from any suitable magnetic material, and may be formed from thin sheet magnetic material, such as without limitation, a thermoplastic permanent magnetic extrusion formed from a polymer-bonded strontium ferrite powder. Second magnet 148 may be joined to front edge 130 and/or rear edge 131 of upright 100 by any suitable manner of attachment, e.g., pressure-sensitive adhesive. As shown, second magnet 148 has an elongate rectangular shape, however, it is contemplated that second magnet 148 may include any suitable shape, and/or may additionally or alternatively include a plurality of magnetic elements disposed on a front edge 130 and/or a rear edge 131 of upright 110.

As described hereinabove, instrument 100 may be formed from injection molded components. In an embodiment, instrument 100 may be formed from two "clamshell" halves 100A, 100B, each having a base half portion and an upright half portion integrally formed therewith. Instrument halves 100A and 100B may be formed any material suitable for injection molding, such as without limitation, polymeric materials including acrylonitrile butadiene styrene (ABS), polyvinyl chloride (PVC), polyurethane (PU), polypropylene (PP), fiber-reinforced plastic (FRP), and the like. Instrument halves 100A and 100B may be injection-molded as described, and/or may be formed by any other suitable manner of manufacture, e.g., machining, forging, and the like, and may be formed from metallic materials such as aluminum, stainless steel, brass, etc., and/or may be formed from wood or any other material with sufficient strength and dimensional stability for use in a measuring instrument. The instrument 100 may include a grip-enhancing coating (not explicitly shown), such as a silicone-based or rubberized coating, disposed on at least a part of an outer surface thereof.

Figure 4:
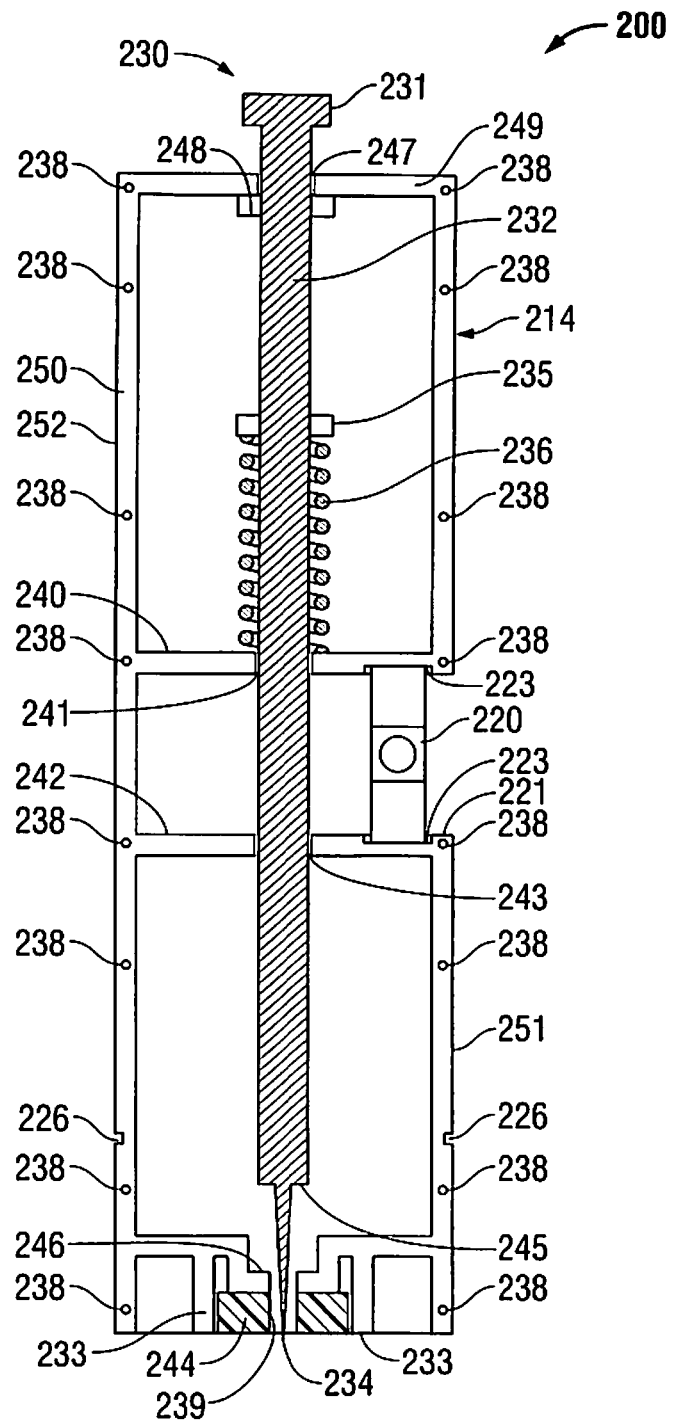
FIG. 4 shows a side, cutaway view of another embodiment of a hands-free measuring instrument in accordance with the present disclosure.

Turning now to FIGS. 3A, 3B, and 4, another embodiment of a measuring instrument 200 having a spike 230 in accordance with the present disclosure is described in detail. The disclosed instrument 200 includes a base 216 having an upright 210 extending orthogonally therefrom. Base 216 and upright 210 may be integrally formed, and/or may be formed in whole or in part from subassemblies as previously described herein. A cutout 223 is defined in base 216 and is configured to retain a first bubble level vial 222 that is mounted therein in alignment with a horizontal axis ("X") of the base. In an embodiment, first bubble level vial 222 may be retained by at least one circular recess (not explicitly shown) defined in either end of cutout 223 that is dimensioned to receive an end of first bubble level vial 222. Additionally or alternatively, any suitable manner of retention of bubble level vial 222 may be employed, as previously described hereinabove. Base 216 may additionally or alternatively include at least one pilot hole 218 disposed therein as discussed above.

Base 216 includes a first magnet 244 joined to a bottom surface 265 thereof. First magnet 244 may include a permanent magnet formed from suitable magnetic materials heretofore discussed, and first magnet 244 may include an electromagnet which may be selectively activated by an actuator (not explicitly shown). A bottom surface of first magnet 244 may be substantially aligned with a bottom surface 265 of base 216 to facilitate sturdy placement of instrument 110 on a desired surface. An opening 239 is defined within first magnet 244 that is dimensioned to accommodate the longitudinal movement of spike tip 234 therethrough. As shown, first magnet 244 may be generally disc-shaped, however it is envisioned that first magnet 244 may encompass any suitable shape.

Base 216 and/or upright 210 may be formed by any suitable manner of manufacture as described herein, including without limitation, injection-molding. One or more reinforcing struts 229 may be included within base 216. One or more reinforcing struts 240, 242 may be included within housing 210. At least one semicircular strut 233 may be formed within base 216 to form a cavity (not explicitly shown) that is dimensioned to retain magnet 244 by any suitable manner of retention, including without limitation, adhesive, plastic welding, clip, threaded fastener, and/or interference fit. Magnet 244 may be formed by injection molding, as described previously herein. As shown, second magnet 248 has an elongate rectangular shape, however, it is contemplated that second magnet 248 may additionally or alternatively include any suitable shape, and/or may include a plurality of magnetic elements disposed on a front edge 230 and/or a rear edge 231 of upright 210.

As described hereinabove, an upright member 210 extends perpendicularly from base member 216. Upright member 210 has a generally elongate cuboid shape having a top surface 224, a first side surface 212 (e.g., a left side), a second side surface 214 (e.g., a right side), a front edge 230, and a rear edge 231. Side surfaces 212 and 214 may include a curved surface, which may have a convex contour, as best seen in, e.g., FIG. 3A. In an embodiment, a front edge 230 of upright 210 is substantially aligned with a front edge 232 of base 216, and/or a rear edge 231 of upright 210 is substantially aligned with a rear edge 233 of base 216.

A cutout 221 is defined in upright 210 that is configured to retain a second bubble level vial 222 that is mounted therein in alignment with a vertical axis ("Y") of the instrument. In an embodiment, second bubble level vial 220 may be retained by at least one circular recess (not explicitly shown) defined in either end of cutout 221 that is dimensioned to receive an end of second bubble level vial 222. It should be understood that any suitable manner of retention of bubble level vial 220 may be employed, as described herein. Upright 210 may include at least one notch 226 defined in a front edge 251 or a rear edge 252 thereof. The at least one notch 226 has a width that is dimensioned to accept a dry line. In an embodiment, the at least one notch 226 is positioned at an easily-remembered distance from a bottom surface of base 216, for example without limitation, ½" or 1 cm. In an embodiment, upright 210 and/or base 216 may include at least one laser diode (not explicitly shown) that is adapted to selectively emit visible laser light of about the 650 nm wavelength, having a beam direction that is aligned with an axis (e.g., "X", "Y", and/or "Z" axis) of instrument 210, to enable instrument 200 to be used as a laser leveling device. The at least one laser diode may be adapted to cooperate with an active target that senses laser light impinging thereon to provide audio and/or visual feedback to a user. In yet another embodiment, upright 210 and/or base 216 may include at least one electromagnetic and/or electroacoustic measuring device, e.g., a laser-based or ultrasound-based rangefinder, to enable the measurement of distances greater than the dimension of upright 210 and/or base 216.

Upright 210 may additionally or alternatively include a series of graduations 229 disposed on a first side 212 and/or a second side 214 of upright 210, adjacent to and substantially following a front edge 251 and/or a rear edge 252 thereof. Graduations 229 may form a ruler demarcated with any suitable unit(s) of measurement, and may have an origin that may coincide with a plane described by a top surface 224 of the upright 210, a top surface 236 of the base 216, and/or a bottom surface 237 of base 216.

A second magnet 248 may be disposed on a front edge 251 and/or a rear edge 252 of upright 210. Second magnet 248 may be formed from any suitable magnetic material, as previously described, and may be joined to front edge 251 and/or rear edge 252 of upright 200 by any suitable manner of attachment.

Instrument 200 may include a spike 230 that is adapted to enable a user to fasten instrument 200 to a workpiece, such as without limitation, a workpiece formed from wood-based materials, masonry, concrete, drywall, composite materials, and the like. Spike assembly 230 includes a shaft 232 slidably disposed along the vertical ("Y") axis and, more particularly, shaft 232 is disposed through the general center vertical axis of upright 210. Shaft 232 may be slidably disposed within a series of guide openings 241, 243, and 247 that are defined within upright 210 and which are dimensioned to permit the free movement of shaft 232 therethrough. Opening 247 may be defined within a top surface 224 of upright 210. Openings 241 and 243 may be defined in internal support members 240 and 242, respectively.

A biasing member 236 provides a biasing force to bias spike 230 in an upward direction, such that, at rest, spike tip 234 is retracted to a position above (e.g., not protruding downwardly beyond) bottom surface 265 of base 216. In this manner, instrument 200 may be used without the risk of spike tip 234 being inadvertently exposed. As shown, biasing member 236 may be a coil spring, however, the use of any suitable resilient biasing member is envisioned, such as, without limitation, a leaf spring, an elastomeric polymer biasing member, and the like. As seen in FIG. 4, biasing member 236 is disposed between internal support member 240 and a retention clip 235 provided on shaft 232 of spike 230, however other additional or alternative arrangements of biasing member 236 and spike 230 are contemplated with departing from the spirit and scope of the present disclosure.

Spike tip 234 is disposed at a bottom end of shaft 232. In one embodiment, spike tip 234 and shaft 232 may be integrally formed. In another embodiment, spike tip 234 and shaft 232 may be detachably coupled by any suitable manner of coupling, e.g., threaded fastener, bayonet mount, and the like, to enable a user to selectively change spike tip 234. The ability to change spike tips may be useful, for example, when a tip becomes worn, or, to select a tip more particularly suited to a specific material. In embodiments, instrument 200 may be provided in a kit which includes several tips, e.g., a tip that is well-suited for use in wooden materials, a tip that is well-suited for use in masonry (such tip may be formed from hardened steel or carbide), a threaded tip (not explicitly shown), and so forth. A shoulder 245 may be provided at a bottom end of shaft 232 which cooperates with a positive stop 246 that is included in base 216 to prevent over-extension of spike tip 234 in a downward direction. A stop clip 248 fixed to shaft 232 cooperates with a top support 249 of upright 210 to retain spike 230 within instrument 200. In an embodiment, instrument 200 may be formed from two "clamshell" halves having one or more alignment nubs 238 provided along a mating edge 250 thereof that are dimensioned to engage with corresponding alignment recesses defined along an opposing edge (not explicitly shown).

Various methods may be utilized to employ spike 230 to attach instrument 200 to a workpiece. Instrument 200 may be positioned on a workpiece. Force, such as a hammer blow or finger pressure, may be applied downwardly to head 231 of spike 230 to drive spike tip 234 into the workpiece, thereby attaching instrument 200 to a workpiece for use. In another variation, where a threaded tip 234 is fitted, a user may position instrument 200 on a workpiece, and apply a downward turning motion to head 231, which in turn, screws threaded tip 234 into the workpiece thereby attaching instrument 200 to the workpiece for use. Head 231 may include at least one indentation defined in a top surface thereof to accommodate a driving tool, such as without limitation, a flat-blade screwdriver, a Philips screwdriver, a Torx, or other screw drive types as will be familiar to the skilled artisan. Head 231 may additionally or alternatively include a hex shape to accommodate, e.g., a six- or twelve-point socket and/or a square shape to accommodate, e.g., an open-end wrench or pliers. It is also envisioned that head 231 may include knurling or other grip-enhancing features to facilitate the manipulation thereof by a user. After use, spike 230 may be withdrawn from the workpiece to free instrument 200 therefrom by e.g., applying upward force to spike 230 and/or head 231, and/or unscrewing same when a threaded tip 234 is employed.

Figure 5A:
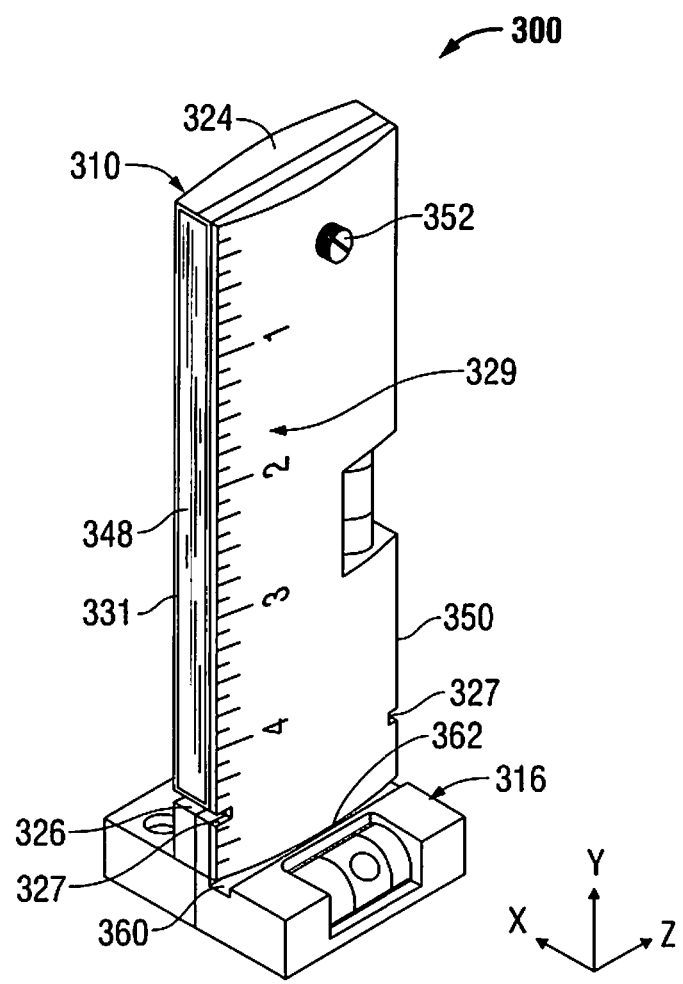
FIG. 5A shows a perspective view of yet another embodiment of a hands-free measuring instrument in accordance with the present disclosure having an adjustable ruler arm in a first position.
Figure 5B:
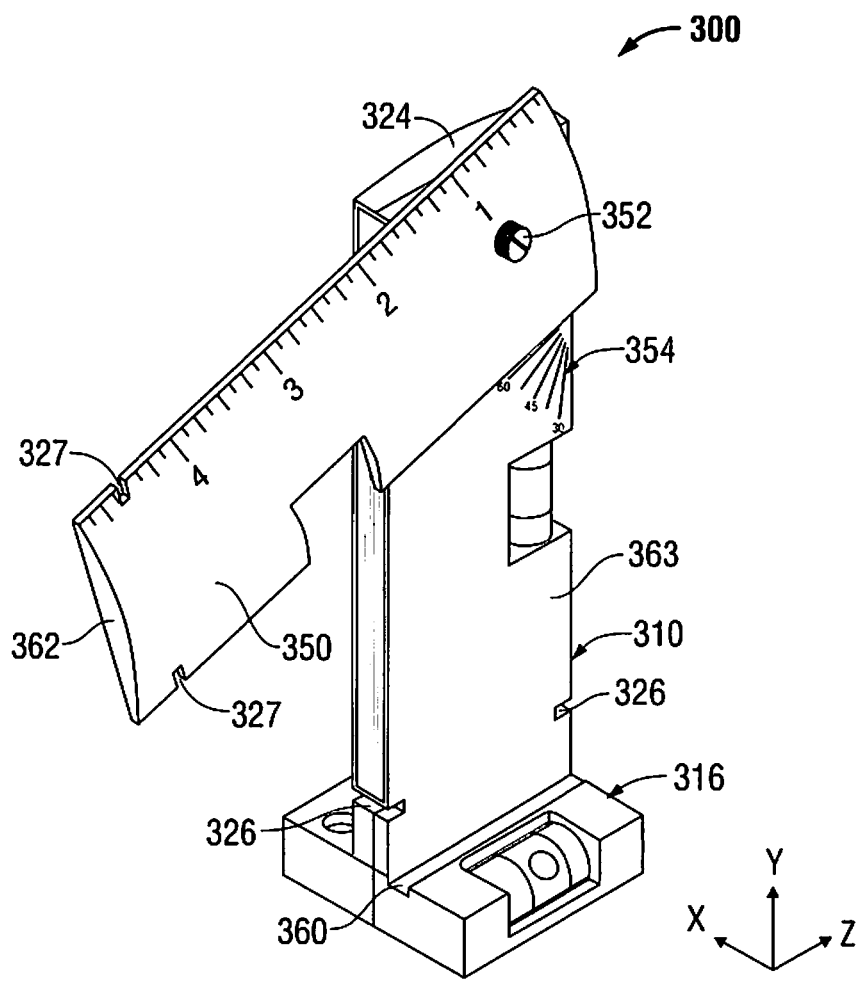
FIG. 5B shows a perspective view of the FIG. 5A embodiment of a hands-free measuring instrument in accordance with the present disclosure having an adjustable ruler arm in a second position.
Figure 5C:
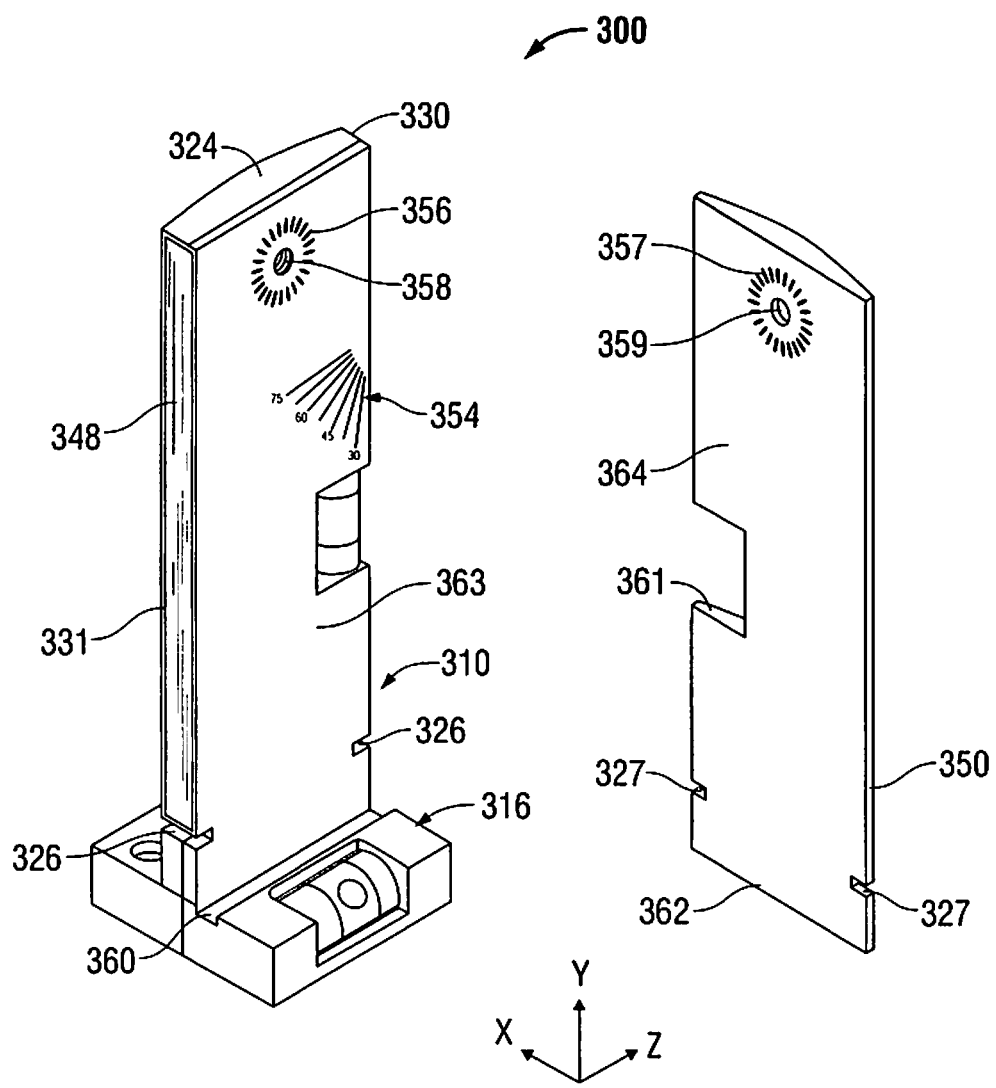
FIG. 5C shows a partial-exploded, perspective view of the FIG. 5A embodiment of a hands-free measuring instrument in accordance with the present disclosure.

Turning now to FIGS. 5A, 5B, and 5C, another embodiment of a hands-free measuring instrument 300 in accordance with the present disclosure includes an adjustable ruler arm 350. The adjustable ruler arm 350 is rotatable around a pivoting retainer 352 that is located adjacent to a top surface 324 of an upright 310. Pivoting retainer 352 is configured to enable the selective fixing and release of adjustable ruler arm 350 such that adjustable ruler arm 350 may be fixed at an arbitrary angle with respect to the Y axis of upright 310. As shown, pivoting retainer 352 is a bolt having a knurled, slotted head suitable for fingertip manipulation that passes through an opening 359 defined within adjustable ruler arm 350 and is threaded into threaded opening 358 provided in upright 310. However, it is to be understood that pivoting retainer 352 may encompass any suitable pivoting arrangement, including without limitation a thumbscrew, a stud (not explicitly shown) extending from upright 310, or a spring-biased retainer that employs friction between upright 310 and adjustable ruler arm 350 to maintain the position of adjustable ruler arm 350. During use, the pivoting retainer 352 is loosened or disengaged, which, in turn, enables adjustable ruler arm 350 to be positioned at a desired angle, whereupon pivoting retainer 352 is tightened or engaged to set the pivoting retainer 352 at the desired angle.

The second magnet 348 may be disposed on a front edge 330 and/or a rear edge 331 of upright 310 as described in detain hereinabove. Hands-free measuring instrument 300 includes a base 316 having a notch 360 defined therein running generally along the X axis of the base. Notch 360 is configured to provide sufficient clearance to enable an end 362 of adjustable ruler arm 350 to swing away from base 316. Notch 360 also secures end 362 to upright 310 when adjustable ruler arm 350 is in a closed position, e.g., when adjustable ruler arm 350 is positioned as shown in FIG. 5A.

Upright 310 includes a series of angular graduations 364 disposed on a face 363 of upright 310. Angular graduations 364 are configured to indicate an angle at which adjustable ruler arm 350 is positioned with respect to upright 310. Angular graduations 364 may be formed by any suitable technique, including without limitation intaglio, embossing, etching, laser etching, printing, silk-screening, over- or inter-molding, and the like. In an embodiment, adjustable ruler arm 350 may include a window defined therein (not explicitly shown) that is configured to expose an indicator corresponding to the angle at which adjustable ruler arm 350 is positioned.

One or more detents 356 are disposed on face 363 of upright 310. The one or more detents 356 are arranged concentrically about the pivot point, e.g., threaded opening 358, of adjustable ruler arm 350. A series of corresponding one or more notches 357 are disposed on an inner face 364 of adjustable ruler arm 350 and are configured to engage the one or more detents 356. The detents 356 and notches 357 are configured to index the adjustable ruler arm to a predetermined position, e.g., to enable the convenient and accurate positioning of adjustable ruler arm 350 to certain angles, e.g., at 15° increments, at 1° increments, and the like. In an embodiment, the detents 356 and/or notches 357 may include a series of radial serrations extending from the pivot point, e.g., threaded opening 358. During use, the detents 356 cooperate with the corresponding notches 357 to restrain the angle of adjustable ruler arm 350 to the precise angles imposed by the arrangement of detents 356 and notches 357.

Figure 6:
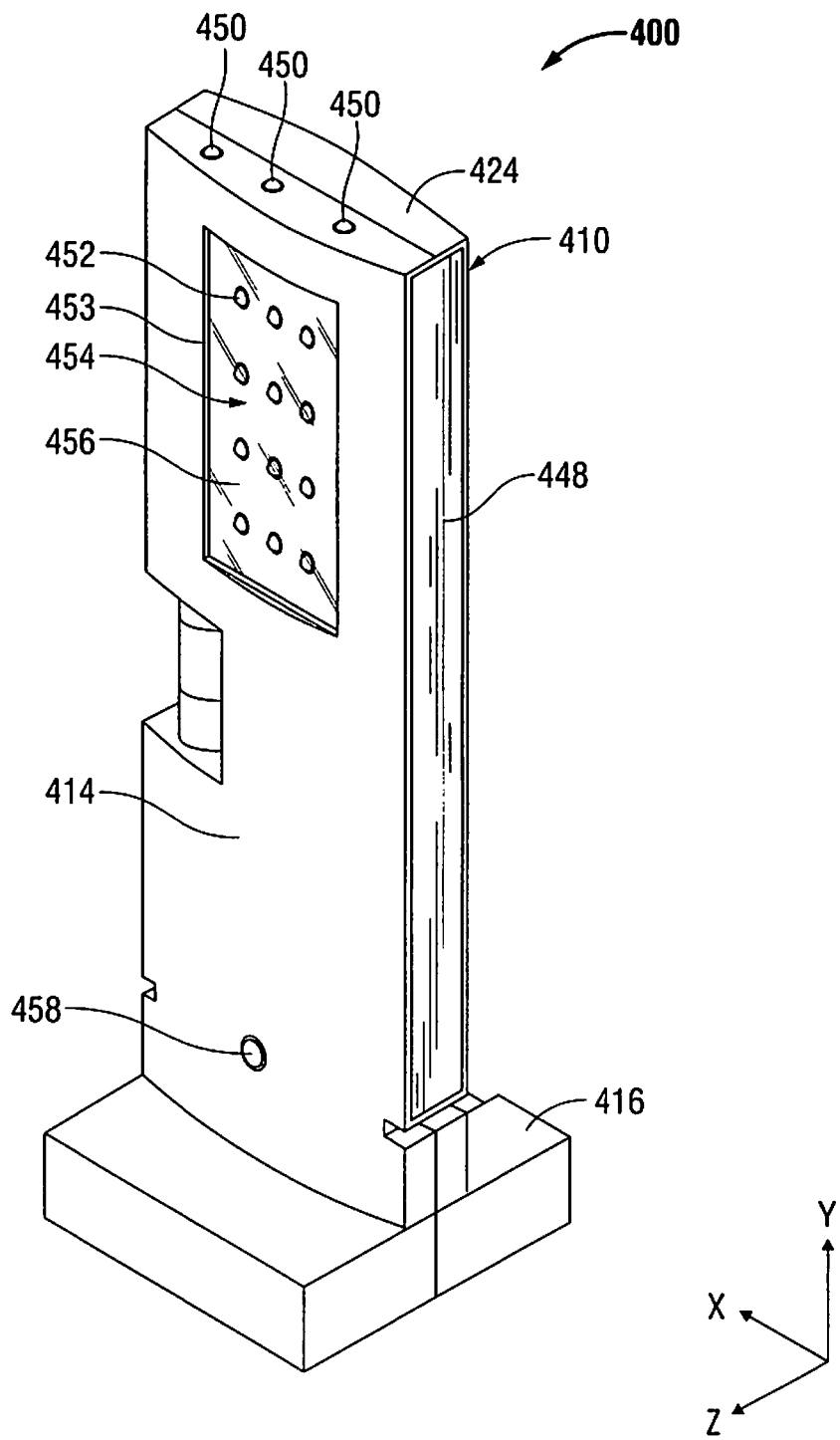
FIG. 6 shows an embodiment of a hands-free measuring instrument having a plurality of light sources in accordance with the present disclosure.

Turning to FIG. 6, an embodiment of a hands-free measuring instrument 400 in accordance with the present disclosure includes one or more light source 450 disposed upon a top surface 424 of an upright member 410 and configured to project light outwardly therefrom. Light source 450 may include an incandescent bulb, a fluorescent bulb, a light pipe (e.g., fiber optic), a single-color light-emitting diode (LED), and/or a multi-color LED. Instrument 400 further includes one or more light source 452 disposed on a side face 414 of upright 410. Light sources 452 are mounted in a recessed region 453 defined in side face 414. Recessed region 453 includes a reflective surface 456 that is configured to reflect and/or diffuse the radiated light from light sources 452. A transparent lens 454 is disposed over the open face of recessed region 453.

A multi-mode light actuator 458 is provided on an external surface of instrument 400 that is configured to selectively activate and deactivate light sources 450, 452. Multi-mode light actuator 458 may include a pushbutton switch, a slide switch, a snap dome switch, or any other suitable switch. Repeated actuation of multi-mode light actuator 458 cause light sources 450, 452 to cycle through a series of different illumination patterns. In one embodiment, a first actuation of light actuator 458 causes one or more light source 450 to illuminate. A second actuation of light actuator 458 deactivates the one or more light source 450 and causes one or more light source 452 to illuminate. A third actuation of light actuator 458 causes both light sources 450 and 452 to illuminate. A fourth actuation of light actuator 458 deactivates both light sources 450, 452. In other embodiments, actuation of multi-mode light actuator 458 may cause other combinations of light sources 450, 452 to be selectively illuminated. For example, and without limitation, an actuation of multi-mode light actuator 458 causes light sources 450 and/or 452 to illuminate with a flashing pattern with a duty cycle of, e.g., 2 Hz. A subsequent actuation of multi-mode light actuator 458 causes light sources 450 and/or 452 to illuminate with a various colors, e.g., cycling through white, red, green, or other colors. In yet another embodiment, a rapid double actuation of multi-mode light actuator 458, e.g., two actuations within 0.5 seconds will cause light sources 450 and/or 452 to extinguish.

The described embodiments of the present disclosure are intended to be illustrative rather than restrictive, and are not intended to represent every embodiment of the present disclosure. Further variations of the above-disclosed embodiments and other features and functions, or alternatives thereof, may be made or desirably combined into many other different systems or applications without departing from the spirit or scope of the disclosure as set forth in the following claims both literally and in equivalents recognized in law.

What is claimed is:

1. A hands-free measuring instrument, comprising:
   a base member having a top surface and a bottom surface;
   a first magnet disposed on a bottom surface of the base member and configured to secure the measuring instrument to a workpiece;
   an upright member coupled to the top surface base and extending orthogonally therefrom;
   a second magnet disposed on a vertical edge of the upright member and configured to secure the measuring instrument to a workpiece; and
   an adjustable ruler arm rotatable around a pivot adjacent to a top surface of the upright member.

2. The measuring instrument in accordance with claim 1, wherein the pivot is configured to selectively retain the adjustable ruler arm in a fixed position relative to the upright member.

3. The measuring instrument in accordance with claim 1, wherein at least one of the upright member or the adjustable ruler arm includes a detent configured to index the adjustable ruler arm to a predetermined position relative to the upright member.

4. The measuring instrument in accordance with claim 1, further comprising at least one pilot hole defined in the base member.

5. The measuring instrument in accordance with claim 1, further comprising at least one notch defined in an edge of at least one of the upright member or the adjustable ruler arm.

6. The measuring instrument in accordance with claim 1, further comprising a plurality of graduations disposed along a vertical edge of at least one of the upright member or the adjustable ruler arm.

7. The measuring instrument in accordance with claim 6, wherein the graduations are enumerated.

8. The measuring instrument in accordance with claim 7, wherein the enumeration has an origin coinciding with a plane described by at least one of a top surface of the upright member, a top surface of the base member, or a bottom surface of the base member.

9. The measuring instrument in accordance with claim 1, further comprising at least one angular graduation disposed on a face of the upright.

10. The measuring instrument in accordance with claim 9, wherein the angular graduations are enumerated.

11. The measuring instrument in accordance with claim 1, further comprising a grip-enhancing coating disposed on at least a part of an outer surface thereof.

12. The measuring instrument in accordance with claim 1, further comprising at least one selectively activatable light source disposed on the upright member.

13. A hands-free measuring instrument, comprising:
   a base member having a top surface and a bottom surface;
   a first magnet disposed on a bottom surface of the base member and configured to secure the measuring instrument to a workpiece;
   an upright member coupled to the top surface base and extending orthogonally therefrom; and
   a second magnet disposed on a vertical edge of the upright member and configured to secure the measuring instrument to a workpiece.

14. The measuring instrument in accordance with claim 12, further comprising at least one pilot hole defined in the base member.

15. The measuring instrument in accordance with claim 12, further comprising at least one notch defined in an edge of the upright member.

16. The measuring instrument in accordance with claim 12, further comprising a plurality of graduations disposed along a vertical edge of the upright member.

17. The measuring instrument in accordance with claim 16, wherein the graduations are enumerated.

18. The measuring instrument in accordance with claim 17, wherein the enumeration has an origin coinciding with a plane described by at least one of a top surface of the upright member, a top surface of the base member, or a bottom surface of the base member.

19. The measuring instrument in accordance with claim 12, further comprising at least one selectively activatable light source disposed on the upright member.

* * * * *